United States Patent [19]

Steffen et al.

[11] 4,309,140
[45] Jan. 5, 1982

[54] SELF-LOCKING THREADED FASTENER AND UNLOCKING TOOL COMBINATION

[75] Inventors: Robert G. Steffen, Bluffton; David L. Gregory, Craigville, both of Ind.; LeVone A. Blough, 111 Horseshoe Dr., Maitland, Fla. 32751

[73] Assignee: LeVone A. Blough, Rocky Mount, N.C.

[21] Appl. No.: 81,399

[22] Filed: Oct. 3, 1979

[51] Int. Cl.³ .................... F16B 39/02; F16B 39/38
[52] U.S. Cl. ................................................ 411/264
[58] Field of Search ............ 151/14 R, 25 A; 85/1 S, 85/1 L; 411/264

[56] References Cited

U.S. PATENT DOCUMENTS

| 514,570 | 2/1894 | Stancliff | 151/14 R |
|---|---|---|---|
| 514,571 | 2/1894 | Stancliff | 151/14 R X |
| 537,244 | 4/1895 | Stancliff | 151/14 R |
| 764,591 | 7/1904 | Hughes | 151/14 R |
| 791,548 | 6/1905 | Fischer | 151/14 R |
| 830,589 | 9/1906 | Harlow | 151/14 R |
| 915,217 | 3/1909 | Ravilly | 151/14 R |
| 960,938 | 6/1910 | Ingels | 151/14 R |
| 1,849,240 | 3/1932 | McCrudden | 151/14 R X |
| 1,874,389 | 8/1932 | Trotter | 151/14 R |

FOREIGN PATENT DOCUMENTS

| 513575 | 11/1920 | France | 151/14 R |
|---|---|---|---|
| 660310 | 2/1929 | France | 151/14 R |
| 824265 | 11/1937 | France | 151/14 R |

Primary Examiner—Ramon S. Britts
Attorney, Agent, or Firm—Gust, Irish, Jeffers & Hoffman

[57] ABSTRACT

A threaded bolt has two elongated shank parts, the adjoining part ends having mating, stepped shapes. The shank parts when held and rotated in unison can be threaded in a piece such as a nut, but when not so held will frictionally bind in the threads of the piece. A keyway is provided through the shank parts to receive a key for rotating the parts in unison, preventing relative rotational movement therebetween, so that the nut and shank parts may be freely threadingly rotated in the aforesaid piece.

4 Claims, 14 Drawing Figures

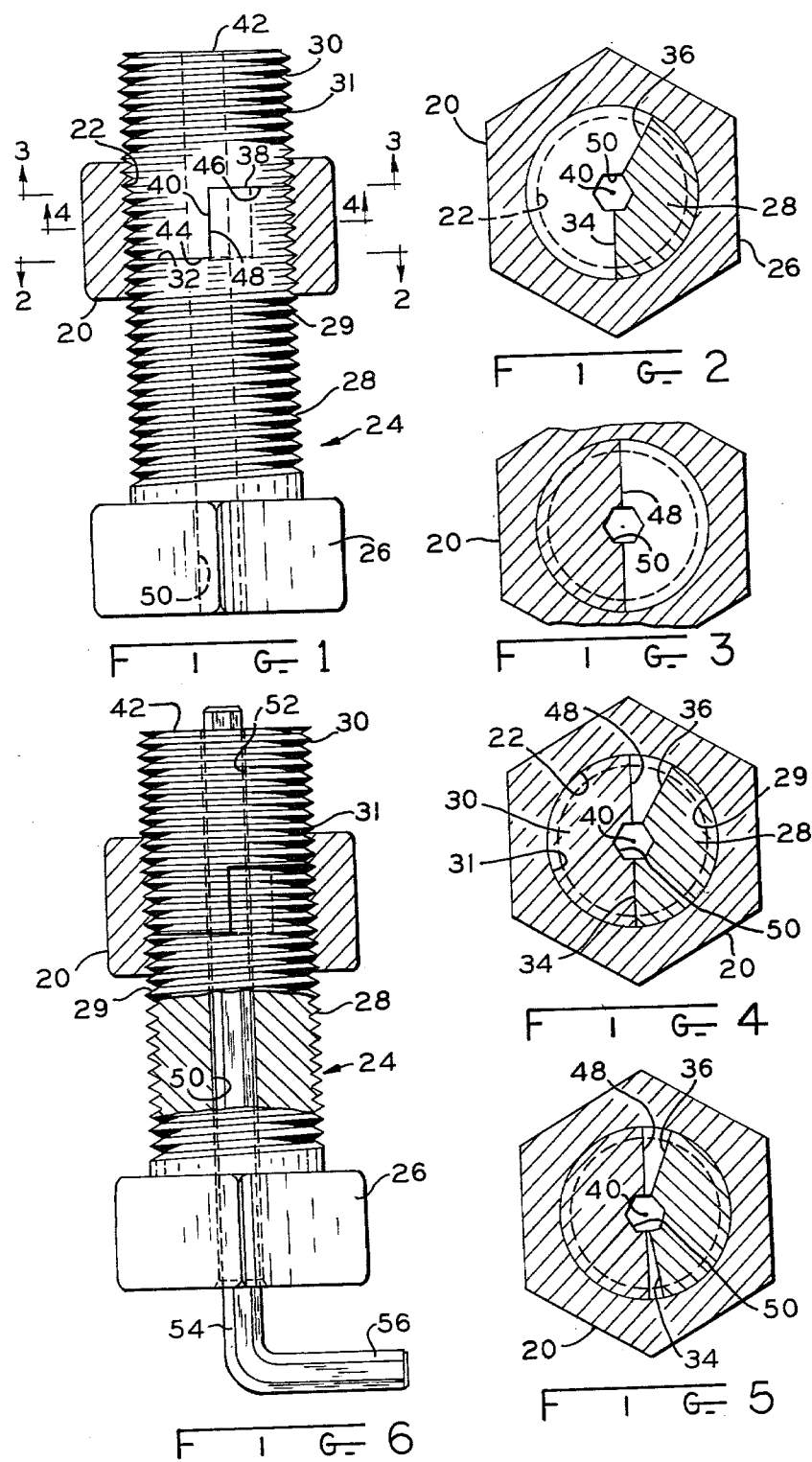

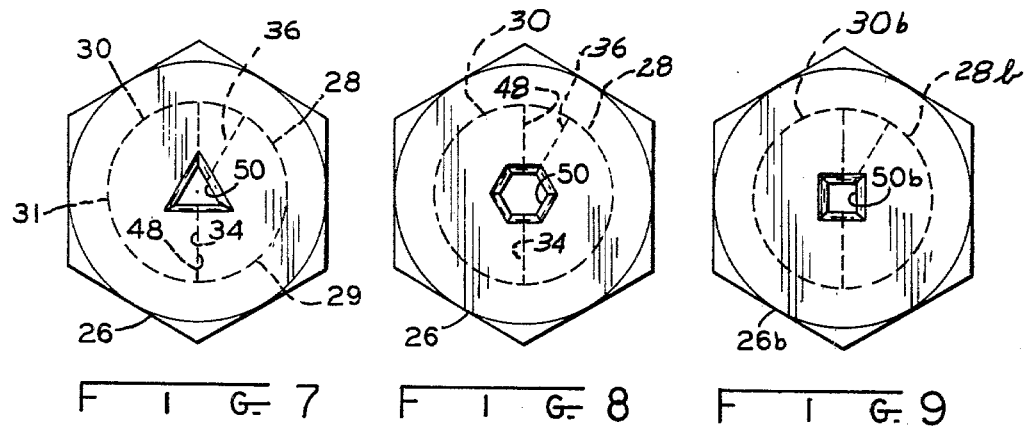
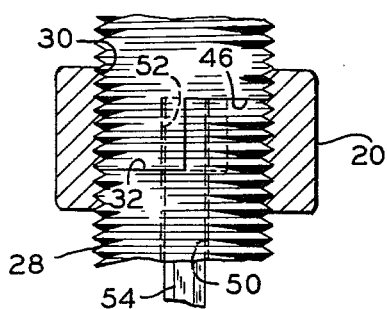
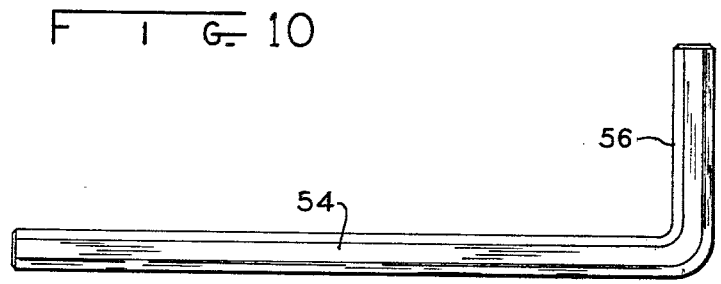

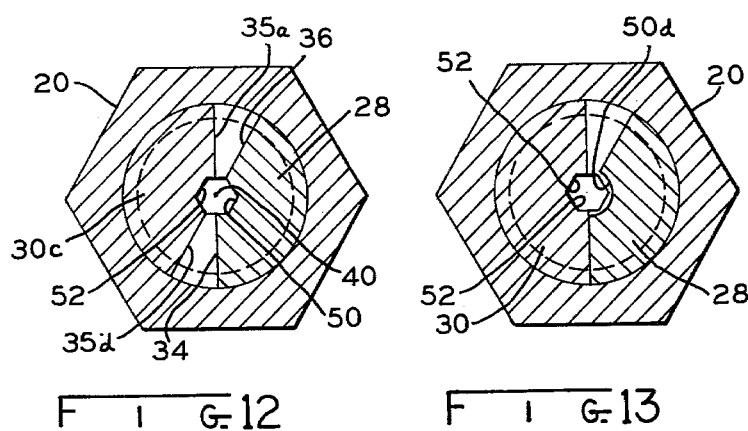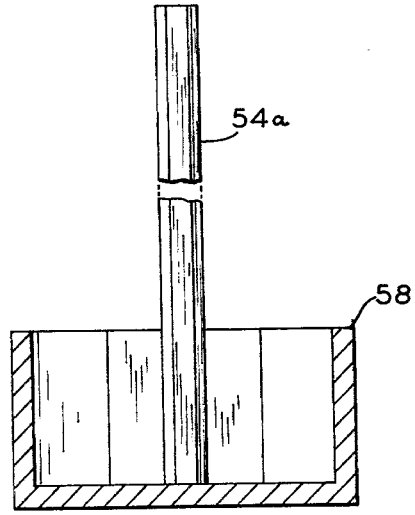

SELF-LOCKING THREADED FASTENER AND UNLOCKING TOOL COMBINATION

BACKGROUND OF THE INVENTION

1. Field of the Invention

This invention is in the field of self-locking threaded fasteners and relates more particularly to such a threaded fastener and tool combination for facilitating the manipulation thereof.

2. Description of the Prior Art

Locking bolt and nut assemblies wherein the bolt shank is in two parts which are relatively rotatable to provide free turning between the bolt and the nut in a tightening direction but to lock against untightening have long been known in the art. The art is exemplified by the devices in the following U.S. Pat. Nos. 514,570; 514,571; 537,244; 764,591 and 830,589.

In U.S. Pat. No. 514,571, the shank parts have an off-center cam so that for an untightening of the nut, one shank part will be forced radially outwardly against the nut threads causing the threads of that one part to bite into the nut threads to lock the bolt and nut against further tightening.

Further, various implements have been used to restrain the outward radial movement of the one shank part during the untightening rotation so that the nut may be removed from the bolt. One such implement is a thin, elongated stem longitudinally insertable between the shank parts to prevent the relative rotational movement and the outward radial movement of a shank part. However, even though the above devices have been known for many years, they have not found general use.

SUMMARY OF THE INVENTION

A bolt has a threaded shank part provided with a stepped end having a pair of angled, radial faces joined at a common longitudinal edge along the bolt axis. A second shank part is stepped at one end which substantially mates with the stepped end of the first part, the second shank part having a longitudinal diametral face. The threads of the shank parts are continuous and matching when the bolt and nut are relatively rotated in one direction, thus permitting free rotation of the bolt within the nut, but when the bolt and nut are rotated in an opposite direction, the shank parts lock in said nut.

A longitudinal, axial keyway, having a polygonal cross section, for example, is provided through the bolt head and shank parts with the keyway surfaces of the first and second parts being aligned when the threads of the shank parts are matching and continuous. The keyway surfaces, when so aligned, receive an elongated key or tool having a comparable and corresponding cross section, to prevent the relative rotation between the shank parts. Thus, the nut may be freely threadingly rotated on the shank parts when the key or tool is inserted in the keyway. With the key removed, the threads of the shank parts jam and lock in the nut for at least one direction of threading rotation.

A further configuration of the stepped ends comprehends the modification of the diametral face to a shape corresponding to the radial faces, such radial faces being diametrically opposed. Thus, the bolt is locked against either tightening or untightening in the nut and can be threaded only when the tool is inserted into the keyway.

It is an object of this invention to provide a self-locking threaded fastener and tool combination which can be manipulated to overcome the locking function.

A further object of this invention is to provide a nut and bolt locking assembly which has a longitudinal keyway for receiving a key to provide for easy removal of the nut from the bolt.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a partly sectioned side elevational view of a self-locking threaded fastener of this invention;

FIG. 2 is a section taken at line 2—2 of FIG. 1;

FIG. 3 is a section taken at line 3—3 of FIG. 1;

FIG. 4 is a section taken at line 4—4 of FIG. 1;

FIG. 5 is a section similar to the FIG. 4 section of the shank parts relatively rotated;

FIG. 6 is a partially sectioned side elevational view of an embodiment with the tool inserted to unlock the fastener;

FIGS. 7–9 are bottom plan views of variations of the embodiment shown in FIG. 6;

FIG. 10 is a partial, sectioned view of a modification of the embodiment shown in FIG. 6;

FIG. 11 is a side elevational view of the key used with the embodiments of FIGS. 6 and 10;

FIG. 12 is a view like FIG. 4 but of a different self-locking fastener;

FIG. 13 is a view of another embodiment of the threaded fastener of this invention; and FIG. 14 is a side view, partly sectioned longitudinally of a different tool design useful in this invention.

DESCRIPTION OF THE PREFERRED EMBODIMENT

Referring to FIGS. 1–5, a nut 20 having threads 22 is threaded onto a two part bolt 24 having a head 26 and two shank parts 28 and 30. Shank part 28 has threads 29 and part 30 threads 31. These, as shown, are right-hand threads. Part 28 has a stepped end formed by transverse surface 32, longitudinally extending angled faces 34, 36, and transverse end surface 38 axially spaced from surface 32. Faces 34 and 36 extended join substantially on bolt axis 40 with the included angle between faces 34 and 36 in the embodiment shown being 130°. Shank part 30 has a flat end 42 and is stepped at its other end to complement the shape of the stepped end of shank part 28, the stepped end of part 30 having axially spaced transverse surfaces 44 and 46 shown adjacent to surfaces 32 and 38, respectively. A planar, diametral surface 48 extends longitudinally between transverse surfaces 44 and 46.

At least one pair of transverse surfaces 32, 44 or 38, 46 should engage when face 34 is engaged with surface 48 when the threads 29 and 31 are properly aligned, this condition being illustrated in FIG. 2.

Considering FIG. 1 and with the two parts 28 and 30 fitted together, the nut 20 may be threaded thereonto in conventional manner. When the nut 20 is initially applied to part 30 and turned in a threading direction, the friction between the threads 22 and 31 turns part 30 until surface 48 engages face 34. The threads 29 and 31 of the two parts are now helically aligned or continuous resembling a solid threaded shank. The nut 20 may thus be turned until it overlies the stepped ends as shown in FIG. 1 thereby joining the two parts 28 and 30 together. In this threading operation it is assumed that the part 28 and head 26 are held stationary.

Now, still holding part 28 and head 26 stationary, the nut will be locked against turning oppositely in an unthreading direction. Initial unthreading, turning movement of nut 20 turns part 30 with it due to the friction between the threads 22 and 31. The face 34 separates from the surface 48 as shown in FIG. 5 resulting in the threads 29 of part 28 jamming in the nut 20 locking it against further unthreading rotation. The result is then that the nut is locked against becoming unthreaded. In order to unthread the nut, the head 26 and part 30 may be grasped to hold the face 34 against surface 48.

Such jamming and locking occurs as follows. With one surface pair 32, 44 or 38, 46 engaged, relative rotation of the shank parts 28 and 30 as shown in FIG. 5 results in the threads 29 and 31 within nut 20 becoming misaligned and axially displaced. Continued unthreading rotation of nut 30 results in further frictional binding of the engaged threads which causes further incremental rotation of shank part 30 and further thread misalignment until the nut becomes locked against further rotation.

In another embodiment, not shown, the intersection of the faces 34 and 36 need not be on axis 40 but instead may be off set therefrom on a diameter of part 28 contemplated by prior U.S. Pat. No. 514,571. In this instance it is not necessary for either of the face pairs 32, 44 or 38, 46 to be engaged in order for the locking to occur.

As regards the size of the cut out on part 28 between face 36 and surface 48, this depends upon the size and looseness of the threads. For threads of greater dimensional tolerance, it is necessary for the cut out to be larger thereby to permit sufficient relative rotation (FIG. 5) of parts 28 and 30 to provide the locking action. Also, it has been found that for finer threads, the intersection of the faces 34 and 36 should be closer to axis 40 so that some relative rotation can occur before lock up.

While a nut 20 has been illustrated as the internally threaded member, such threads may be formed in other bodies such as plate material and the like.

The manual grasping of part 30 to remove nut 20 from bolt 24 may prove inconvenient due to the inaccessibility of end 42. The tool arrangement of FIG. 6 provides for free removal of nut 20 from bolt 24 without the need for accessibility to end 42 of shank part 30. In the arrangement of FIG. 6 an axial keyway 50 having a polygonal cross section is provided in head 26 and shank part 28, and a second axial keyway 52 having a matching polygonal cross section with keyway 50 is formed in shank part 30. The cross section of keyways 50, 52 is hexagonal in FIGS. 6 and 8. Other polygonal cross sections may also be used, keyway 50a of FIG. 7 being triangular and keyway 50b of FIG. 9 being square. Keyways 50, 52 are formed in their respective parts 28 and 30 so that their cross sections are aligned and in registry when face 34 abuts surface 48 during which threads 29 and 31 are continuous and aligned to that nut 20 may be freely rotated in both the untightening and tightening directions relative to head 26. When the shank parts 28 and 30 are so aligned and in registry, an elongated key 54, having handle 56 at one end and a cross section corresponding to the cross section of keyways 50, 52 may be easily and freely inserted with a sliding fit into keyways 50, 52, FIG. 6. When key 54 is so inserted, rotation of handle 56 will rotate parts 28 and 30 in unison maintaining the relative thread 29, 31 alignment permitting free removal of nut 20 from bolt 24 or of bolt 24 from a plate, for example, having threads like threads 22. When key 54 is inserted in keyways 50, 52, relative rotation between parts 28, 30 is prevented and no relative rotation therebetween occurs thereby providing for the free removal.

It is unnecessary that keyways 50, 52 extend through parts 28, 30, respectively, it only being necessary that one keyway extend through its corresponding part and the other keyway extend into its corresponding part a sufficient distance to effect the aforementioned rotation in unison of parts 28, 30. Referring to FIG. 10, an embodiment is shown wherein keyway 50 extends through part 28 but keyway 52 extends only to surface 46 of part 30. With the keyways 50, 52 aligned and in registry, key 54 may be inserted to effect the previously mentioned free removal of nut 20. Alternatively, keyway 52 may be formed through part 30 and keyway 50 may extend only to surface 32 to similarly achieve the free removal of nut 20. It will be understood that key 54 must be inserted through part 30 when keyway 50 extends only partially through part 28.

In FIG. 12 is illustrated a modified threaded fastener which self locks in both threading and unthreading directions of rotation.

Instead of the part 30 being provided with a diametral surface 48, the corresponding part 30c has a diametral surface angled to provide radial faces 35a and 35b which if extended would intersect on the bolt axis 40. These surfaces 35a and 35b are angled in the same manner on the part 30c as faces 34 and 36 on part 28.

With the parts 28 and 30c in the position shown in FIG. 12, the threads 29 and 31 are in alignment as they are shown in FIGS. 1 and 6 and further as depicted by FIG. 4. Rotation of the part 30c relative to part 28 both clockwise and counterclockwise produces the misalignment between the threads 29 and 31 which prevent the nut 20 from being either threaded onto or unthreaded from the bolt assembly. Thus, the bolt assembly becomes self-locking against either threading or unthreading.

In order to rotate the bolt assembly 28, 30c in the nut 20 or a similarly internally threaded part, such as a metal plate, a key, such as key 54, is inserted into the keyways 50 and 52 the same as previously explained thereby maintaining the parts 28 and 30c with the threads thereof aligned. By rotating the key 54, the bolt assembly 28, 30c may be either threaded into or out of the nut 20. Without the key 54 inserted, the nut 20 can neither advance nor retract on the threads thereof.

Reference may now be had to FIGS. 13 and 14 wherein a slightly different embodiment of this invention is shown. FIG. 13 is a view corresponding to FIG. 12. Instead of the keyway 50d in the part 28 being hexagonally shaped, it is made round as shown by the numeral 50d. The keyway 52 is provided in the part 30 as described previously. Thus a hexagonal key 54 may be inserted with clearance through the bore 50d and inserted into the keyway 52 thereby to turn the part 30. This serves as a convenient method of holding or rotating the part 30 relative to the part 28.

As shown in FIG. 14, the hexagonal key in the form indicated by the numeral 54a instead of being provided with a handle 56 as shown in FIG. 11 is welded at one end to a conventional socket wrench 58 which is adapted to fit over the hexagonal head 26. Thus, with the key 54a inserted through the bore 50d and into the keyway 52 and the wrench 58 engaged with the head 26, the parts 28 and 30 are held against relative rotation. In this position, the face 34 (FIG. 4) will be engaged with the surface 48 such that the nut 20 may be threaded in either direction on the bolt assembly. This same arrangement of the round bore 50d and keyway 52 may be used in the embodiment of FIG. 12 such that when the key 54 is inserted as previously explained and the wrench 58 fitted over the bolt head 26, the bolt may be threaded into or out of the nut by merely rotating the wrench 58.

This arrangement of FIGS. 13 and 14 are particularly useful in connection with a threaded fastener in which the internally threaded member is a metallic plate which prevents manual access to the far end of the bolt assembly, in other words, the part 30, when the bolt is screwed into place. By use of the tool of FIG. 14, the bolt assembly may be screwed into and out of the plate with ease.

While there have been described above the principles of this invention in connection with specific apparatus, it is to be clearly understood that this description is made only by way of example and not as a limitation to the scope of the invention.

What is claimed is:

1. A self-locking threaded fastener combination which includes a bolt assembly and a nut-like element comprising first and second threaded shank parts in end-to-end relation adapted to be conjointly threaded into said element, an axial keyway having a predetermined polygonal cross section extending through one shank part and at least partially through the other shank part, a key having a corresponding cross-sectional shape slidably received by said keyway for turning said shank parts in unison in said nut-like element, the adjacent ends of said shank parts having stepped end portions, each step including transverse surfaces, the transverse portions on the first shank part being connected by a pair of axially extending radial faces which if extended would join substantially on the axis of said first shank part, said radial faces forming an obtuse angle therebetween of less than 180°, said transverse portions on said second shank part being joined together by third and fourth axially extending radial faces which if extended would join substantially on the axis of the second shank part, said third and fourth radial faces forming an obtuse angle therebetween of less than 180°, the threads of said shank parts being continuous and aligned when the radial faces thereon are in predetermined spaced relation and said keyways in said shank parts are in alignment whereby said nut-like element may be threadingly rotated thereon in either direction, said nut-like element locking on the threads of said shank parts when said key is removed, said keyways are misaligned and said radial faces in relative positions other than in said predetermined spaced relation.

2. The fastener combination of claim 1 in which the keyway in one of said shank parts is of a size larger than said key to provide clearance therewith and is of a shape other than said polygonal cross section, said one shank part having a tool receiving head thereon, said key having a wrench element on one end thereof engageable with said head to prevent relative rotation between said key and said one shank part when said key is received by said keyway in said other shank part.

3. A self-locking threaded fastener combination which includes a bolt assembly and a nut-like element comprising first and second threaded shank parts in end-to-end relation adapted to be conjointly threaded into said element, an axial keyway having a predetermined polygonal cross section extending through one shank part and at least partially through the other shank part, a key having a corresponding cross-sectional shape slidably received by said keyway for turning said shank parts in unison in said nut-like element, the keyway in one of said shank parts being of a size larger than said key to provide clearance therewith, said one shank part having a tool receiving head thereon, said key having a wrench element on one end thereof engageable with said head to prevent relative rotation between said key and said one shank part when said key is received by said keyway in said other shank part.

4. The fastener combination of claim 3 wherein said head is in the form of an enlargement having at least one flat surface, said wrench element being in the form of a socket which slidingly fits over said head.

* * * * *